United States Patent [19]
Harrap et al.

[11] 3,926,665
[45] Dec. 16, 1975

[54] METHOD AND APPARATUS FOR COLLECTING FIBER WASTE FROM OPEN-END SPINNING MACHINES

[75] Inventors: John Harrap, Prestbury; Richard Gordon Stewart, Heaton Mersey, both of England

[73] Assignee: Parks-Cramer (Great Britain), Ltd., Oldham, England

[22] Filed: Oct. 24, 1973

[21] Appl. No.: 409,055

Related U.S. Application Data

[63] Continuation-in-part of Ser. No. 366,963, June 4, 1973, abandoned.

[52] U.S. Cl. .................... 134/18; 15/319; 55/272; 55/294; 55/350; 57/58.89; 57/156; 134/21; 169/46; 169/60
[51] Int. Cl.² .... B08B 5/04; A62C 1/00; D01H 7/00
[58] Field of Search ............ 134/21, 18, 37; 15/301, 15/319, 347, 352; 169/2 R, 46, 47, 60, 61; 55/261, 272, 273, 274, 294, 301, 302, 304, 305, 315, DIG. 8, DIG. 29, 350; 57/56, 58.89, 156

[56] References Cited
UNITED STATES PATENTS

| | | | |
|---|---|---|---|
| 2,355,664 | 8/1944 | McMann | 169/2 R |
| 2,431,726 | 12/1947 | Bechtler | 57/56 X |
| 2,685,939 | 8/1954 | Parrett | 55/301 |
| 3,046,162 | 7/1962 | Black, Jr. | 134/21 X |
| 3,437,520 | 4/1969 | Black, Jr. | 134/21 |
| 3,486,309 | 12/1969 | Wild | 55/272 |
| 3,627,584 | 12/1971 | Stewart | 134/21 |
| 3,771,365 | 11/1973 | Schempp | 55/274 X |

*Primary Examiner*—Robert L. Lindsay, Jr.
*Assistant Examiner*—Richard V. Fisher
*Attorney, Agent, or Firm*—Parrott, Bell, Seltzer, Park & Gibson

[57] ABSTRACT

An improved system for maintaining a continuous suction air flow through the yarn spinning rotors of a plurality of open-end spinning machines, wherein fiber waste from each machine is entrapped against a respective primary filter moved periodically so that the air flow dislodges the collected fiber waste therefrom, with the dislodged fiber waste being conveyed by the air flow to a secondary filter common to and communicating with all of the primary filters and from which the fiber waste is removed in a continuous manner. In the event of a fire in the fiber waste adjacent any of the primary filters such fire is sensed and, in response thereto, the air flow through the respective primary filter and the operation of the respective machine are interrupted as a fire extinguisher is activated for extinguishing any burning fiber waste without interrupting operation of the remaining machines. Also, in the event of fiber waste adjacent the secondary filter catching fire, the air flow therethrough and through all of the primary filters is interrupted, and the operation of all of the textile machines also is interrupted as another fire extinguisher is activated for extinguishing the fire.

33 Claims, 7 Drawing Figures

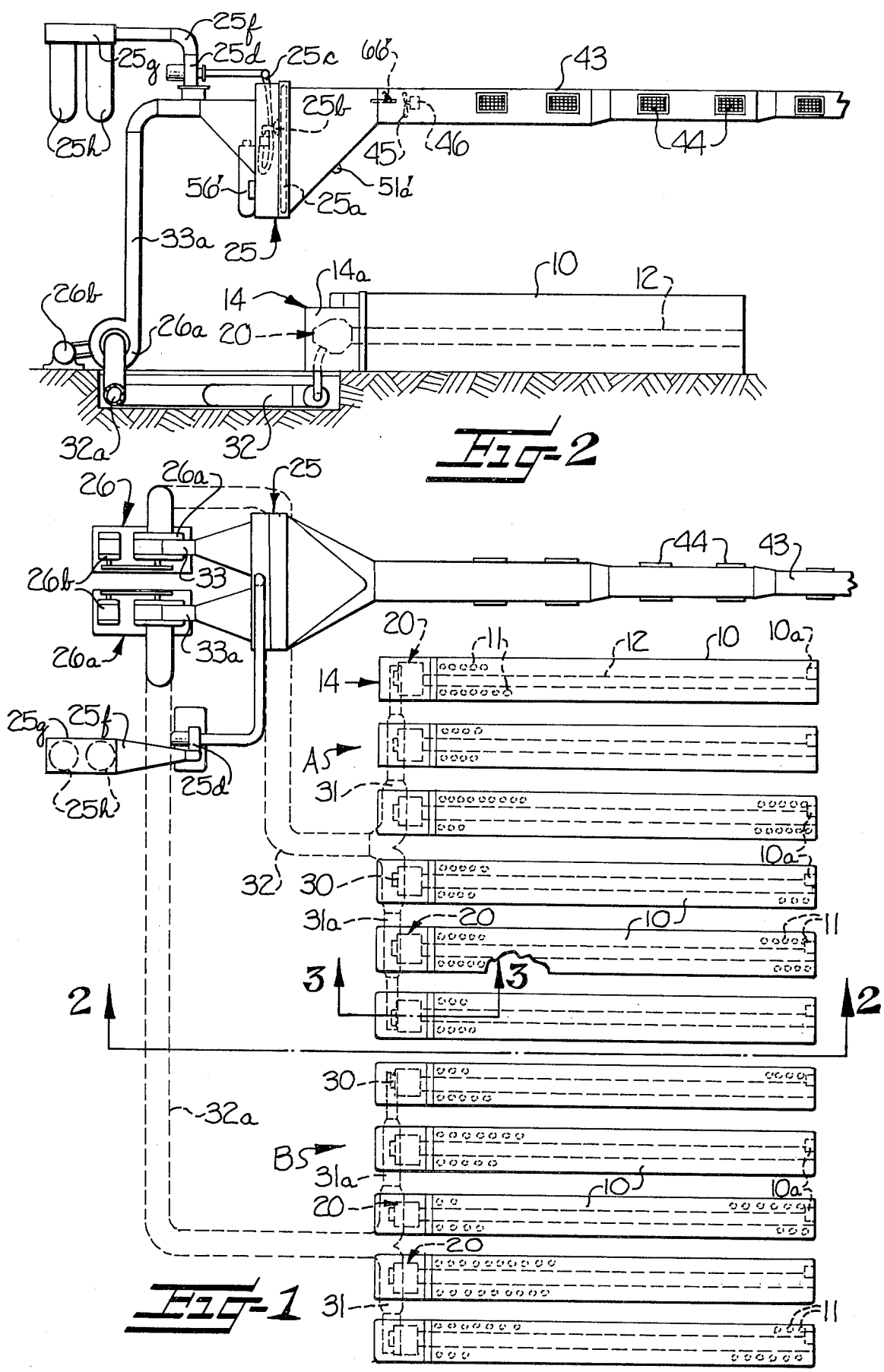

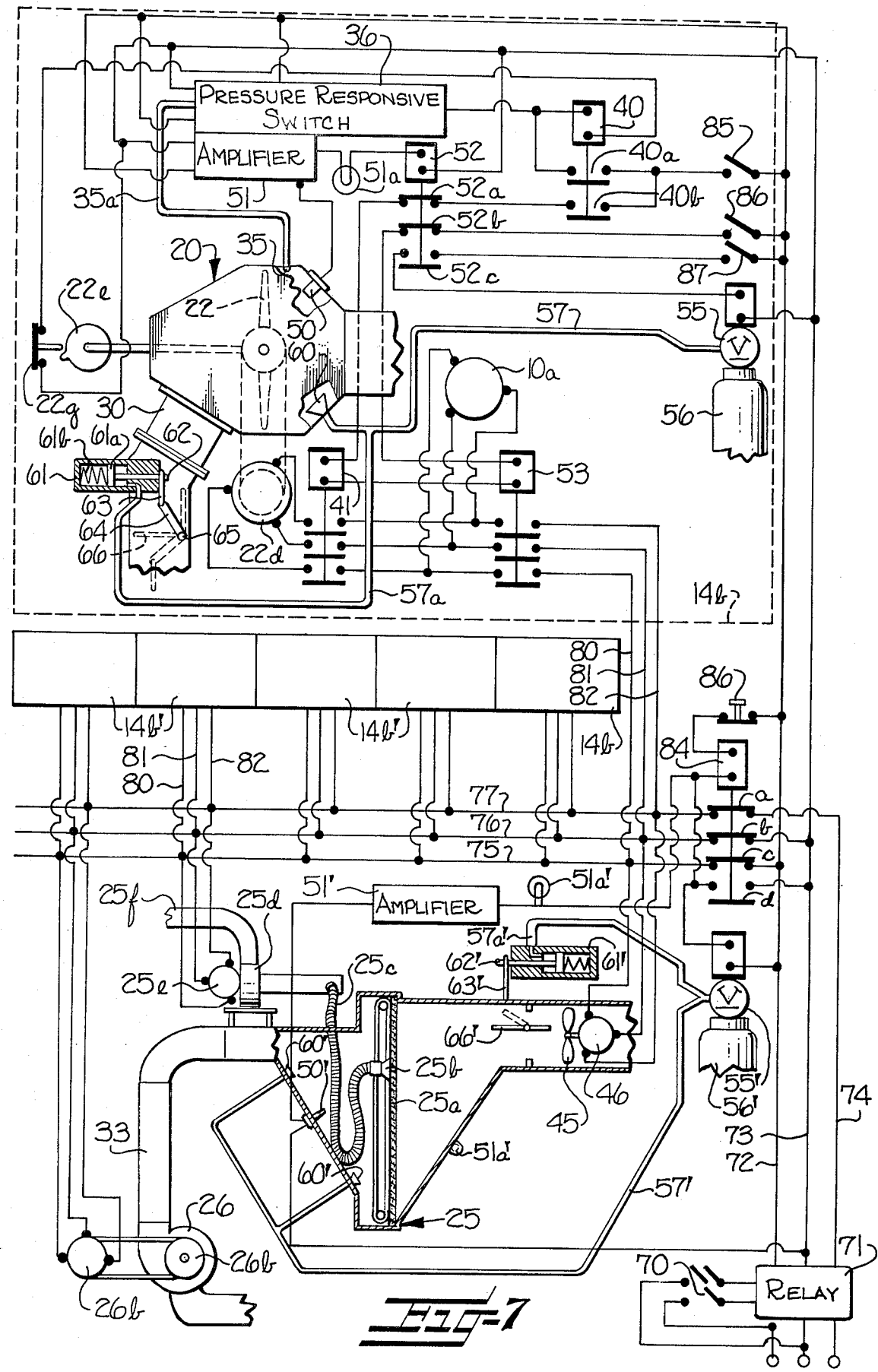

METHOD AND APPARATUS FOR COLLECTING FIBER WASTE FROM OPEN-END SPINNING MACHINES

This application is a continuation-in-part of our copending application Ser. No. 366,963, filed June 4, 1973 and entitled METHOD AND APPARATUS FOR COLLECTING FIBER WASTE FROM TEXTILE MACHINES now abandoned.

This invention relates to open-end spinning machines, and more especially to an improved method and apparatus for continuously removing and collecting fiber waste from the rotors of open-end spinning machines and for preventing a conflagration in the event of a fire in any of the fiber waste emanating from such rotors.

As is generally known, each of the spinning units or spinning heads of most open-end spinning machines comprises a hollow spinning rotor into which separated fibers are directed through a tube or passage by means of a continuous air stream, known as "spinning air", which transports the fibers nearly tangentially onto the interior collecting surface or chamber portion of a rotor. In the rotor, the fibers are subjected to centrifugal forces so that they are pressed against the collecting surface. The fiber strand thus formed is withdrawn from the rotor while twist is inserted therein to form the yarn. As the yarn is withdrawn, new fibers are introduced into the rotor, making spinning continuous.

It is apparent that rotor-type open-end spinning machines are quite different from conventional ring spinning or pot spinning machines, especially to the extent that conventional spinning machines do not require a constant suction air flow at each spindle in order to effect the spinning process. On the other hand, in order to spin yarn on a rotor-type open-end spinning machine, as indicated above, it is essential that a suction air flow is maintained through each spinning unit at all times during operation of the machine.

In fact, in order to form yarn of the desired quality and to prevent frequent ends-down conditions, it is necessary that the static pressure of the spinning air flowing through the rotor of each spinning unit is maintained at or in excess of a predetermined critical operating pressure. Most open-end spinning machines currently in use require a constant operating static water gauge air pressure of at least 17 inches of water and preferably 18 inches of water at about 3.5 to 7 cubic feet per minute per rotor. Otherwise, the yarn may break or be of poor quality. Additionally, fiber waste; e.g., dust and fibers resulting from an interruption in the spinning process such as an end break during the piecing of a broken end of yarn, is generated as an incident of the operation of the spinning rotors of open-end spinning machines, and the formation of the yarn is detrimentally affected if such fiber waste is not continuously and promptly removed from each rotor by a suction air flow.

A very effective method and apparatus for providing continuous spinning air and continuously pneumatically cleaning individual open-end spinning machines is disclosed in U.S. Pat. No. 3,627,584, issued to Richard Gordon Steward on Dec. 14, 1971, and wherein the fiber-waste-laden suction air stream from the spinning units of the machine is alternately diverted through first and second channels having respective filters therein. The channels are so arranged that the fiber waste can be removed from one channel while the air stream is flowing through the other channel and vice versa, so that the fiber waste can be removed from each channel without reducing or interrupting the flow of the air stream.

It is the primary object of this invention to provide an improved method and apparatus for normally maintaining a substantially constant flow of spinning air through the rotors of each of a plurality of open-end spinning machines connected through respective filters to a common or centralized source of suction and wherein, upon occurrence of a fire in the fiber waste at the respective filter, the corresponding open-end spinning machine is stopped in response thereto and the air flow through its filter is interrupted and the fire, if any, is extinguished without interfering with normal operation of the remaining machines or with the effective flow of spinning air therethrough.

It is another object of this invention to provide an improved method and apparatus for collecting fiber waste generated as an incident of the operation of a plurality of rotor-type spinning units of each of a plurality of open-end spinning machines, and wherein a primary filter at each of the textile machines is cleaned periodically by the air flow, without reducing the efficiency of the air flow at the spinning units, and wherein a secondary filter downstream of and common to all of the textile machines is provided for collecting the fiber waste cleaned from each of the primary filters and from which secondary filter the collected fiber waste is removed continuously.

Such an arrangement of the primary and secondary filters not only simplifies the cleaning of the primary filter associated with each textile machine, but it also permits the sensing and extinguishing of any fire occurring in the fiber waste at the respective primary filter while isolating any such fire and thereby permitting uninterrupted operation of the remaining machines.

It is therefore another object of this invention to provide a method and apparatus of the character described in which the occurrence of a fire in the fiber waste being entrapped by any of the primary filters is sensed, and the air flow through the respective primary filter is interrupted in response to the sensing of such a fire to prevent burning fiber waste which may not be extinguished instantly at the respective primary filter from being borne to the secondary filter by the air flow.

According to the invention, a suction air flow is effected through the rotors of the spinning units of each of a plurality of open-end spinning machines, and the air is caused to flow into a respective duct communicating with the spinning units of each machine. Such suction air flow is effected by producing a suction air stream at a common source of suction downstream of and communicating with the ducts of all the machines so that the air flows along the ducts toward such area while also flowing through a primary filter for each duct whereby the fiber waste from the rotors of each open-end spinning machine is entrapped against the respective primary filter.

The entrapped fiber waste is periodically dislodged from each primary filter while the fiber waste being dislodged is caused to be entrained in the air flow downstream of each respective primary filter and thus is directed against the upstream side of a common secondary filter downstream of all of the primary filters as the air flows through the secondary filter. A fire sensing means senses the occurrence of any fire in the fiber waste while it is being entrapped by each of the primary filters, and the air flow through the respective duct and the primary filter is interrupted in response to such sensing without interrupting the air flow through the ducts and primary filters of the remaining machines so that the burning fiber waste at the respective primary filter will be prevented from being conveyed to the secondary filter by the air flow during the operation of the remaining machines. Additionally, the corresponding textile machine is stopped, and an adjacent fire extinguishing means is activated in response to such sensing of a fire in the fiber waste adjacent any one or more of the primary filters to extinguish such fire.

Some of the objects and advantages of the invention having been stated, others will appear as the description proceeds when taken in connection with the accompanying drawings, in which:

FIG. 1 is a top plan view of an embodiment of the invention showing a plurality of open-end spinning machines provided with the improved pneumatic fiber waste collecting system of the present invention;

FIG. 2 is an elevation partially in section, taken substantially along line 2—2 in FIG. 1;

FIG. 7 is a schematic diagram of electrical and fluid circuits for controlling the operation of the fiber waste collecting system in accordance with the invention.

Figure 3:
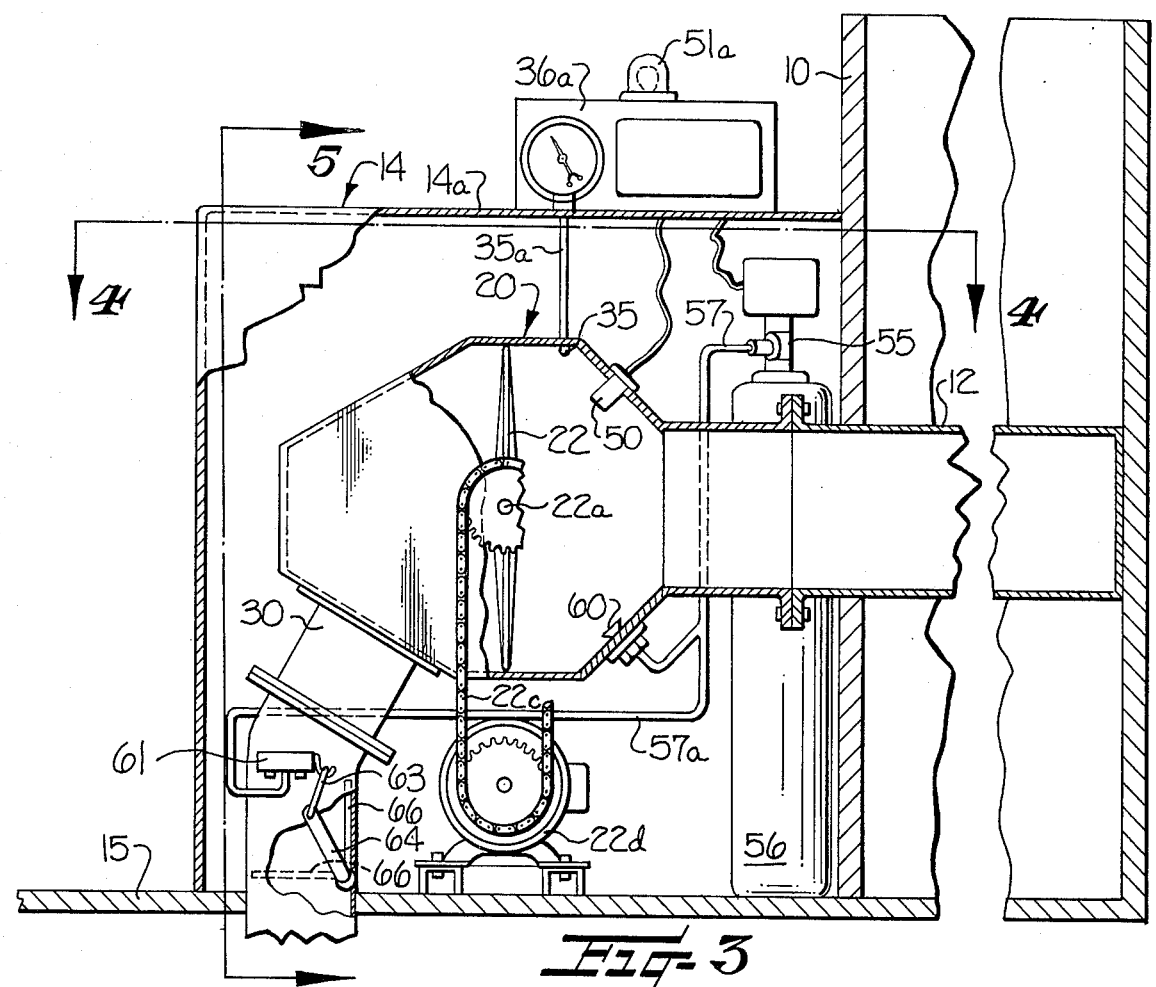
FIG. 3 is an enlarged fragmentary vertical sectional view, with parts broken away, taken substantially along line 3—3 in FIG. 1 and showing one of the primary filter units of the present invention associated with a corresponding one of the open-end spinning machines.

As is well known in the art, in order to obtain economical and efficient operation of open-end spinning machines, it is necessary to maintain a substantially constant suction current of spinning air through the rotor of each spinning unit and to dispose of broken ends of strands, dust particles and other fiber waste generated by the operation of the rotors and other elements of the spinning units of the machines. The continuous disposition of such fiber waste from the spinning units of open-end spinning machines is especially important, since the formation of the yarn is detrimentally affected or interrupted if fiber waste is not continuously and promptly removed from the rotor of each spinning unit by means of a continuous suction air flow therethrough at all times during the operation thereof.

On the other hand, the danger of producing a spark in any of the rotors and thus causing the fiber waste to catch fire as it is being collected has presented a serious problem heretofore, since open-end spinning machines, in particular, are very expensive and, it one of them caught fire, the fire could quickly spread to other adjacent machines and cause a serious conflagration. Obviously, if the fiber waste being collected at one machine should catch fire, it would be advantageous to interrupt the air flow through such machine, stop the machine, and extinguish the burning fiber waste without interfering with the normal operation of other adjacent spinning machines.

The present invention not only normally assures a continuous flow of spinning air and efficient removal of fiber waste from the rotors of each machine and the collection of the fiber waste against a primary filter in a filter box of each respective machine, but it also ensures that, in the event of the occurrence of a fire in the fiber waste being collected at any one of the machines, that particular machine will be shut down, the air flow therethrough will be cut off and the burning fiber waste will be extinguished without adversely affecting the operation of any of the other open-end spinning machines, even though the primary filter boxes of all of the machines may be connected to a common source of suction. The present invention also provides for the distribution and recirculation of the air from the various machines back into the spinning room after the fiber waste has been separated from the flowing air.

Accordingly, referring now more specifically to the drawings and especially to FIGS. 1 and 2, there will be observed a plurality of textile rotor-type open-end spinning machines. As shown, the open-end spinning machines are arranged in two groups A, B and each machine is indicated at 10 in both groups A, B. Each machine 10 may be of the type generally disclosed in said U.S. Pat. No. 3,627,584 and includes opposing rows of rotor-type open-end spinning units 11 which are only shown schematically in FIG. 1 and are communicatively connected to a corresponding main suction conduit or duct 12. The spinning units 11 may be generally of the type disclosed in U.S. Pat. No. 3,425,205 issued to Hans Landwehrkamp et al. on Feb. 4, 1969, and the spinning rotors, not shown, of each machine 10 may be driven by an electric motor 10a. Since rotor-type open-end spinning machines are generally well-known in the textile industry a further description thereof is deemed unnecessary.

Figure 4:
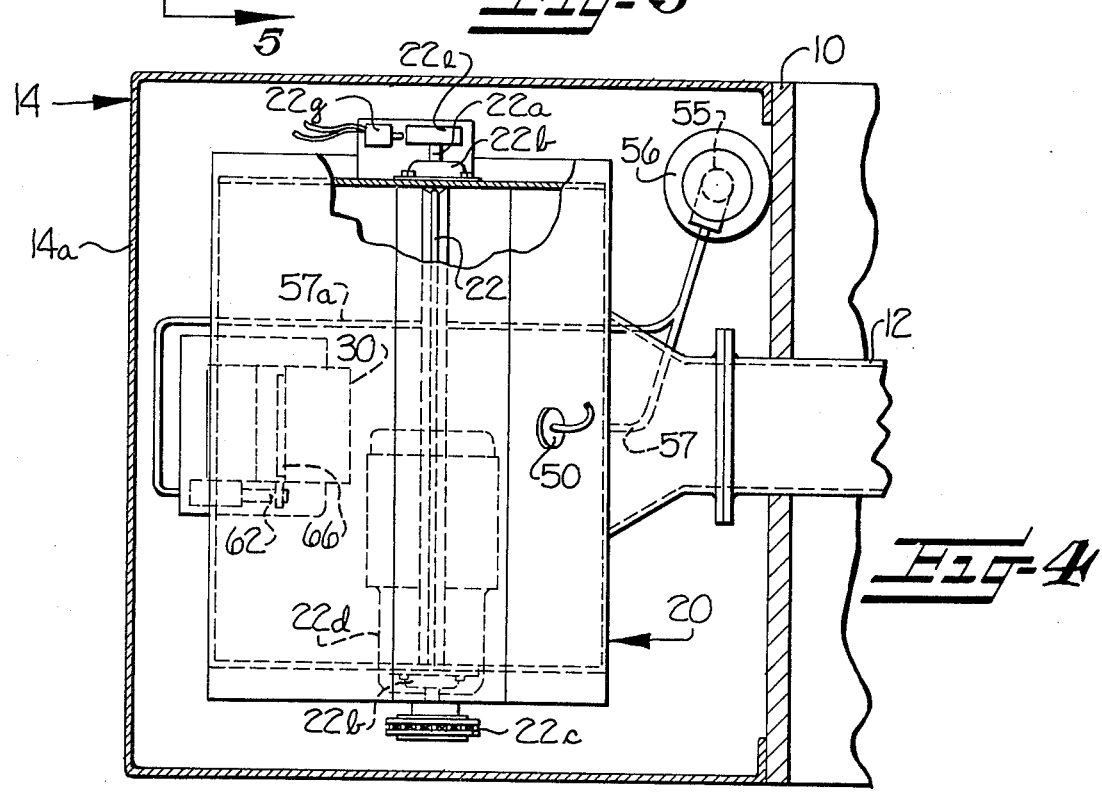
FIG. 4 is a top plan view, partially in section and partially broken away, taken substantially along line 4—4 in FIG. 3.
Figure 5:
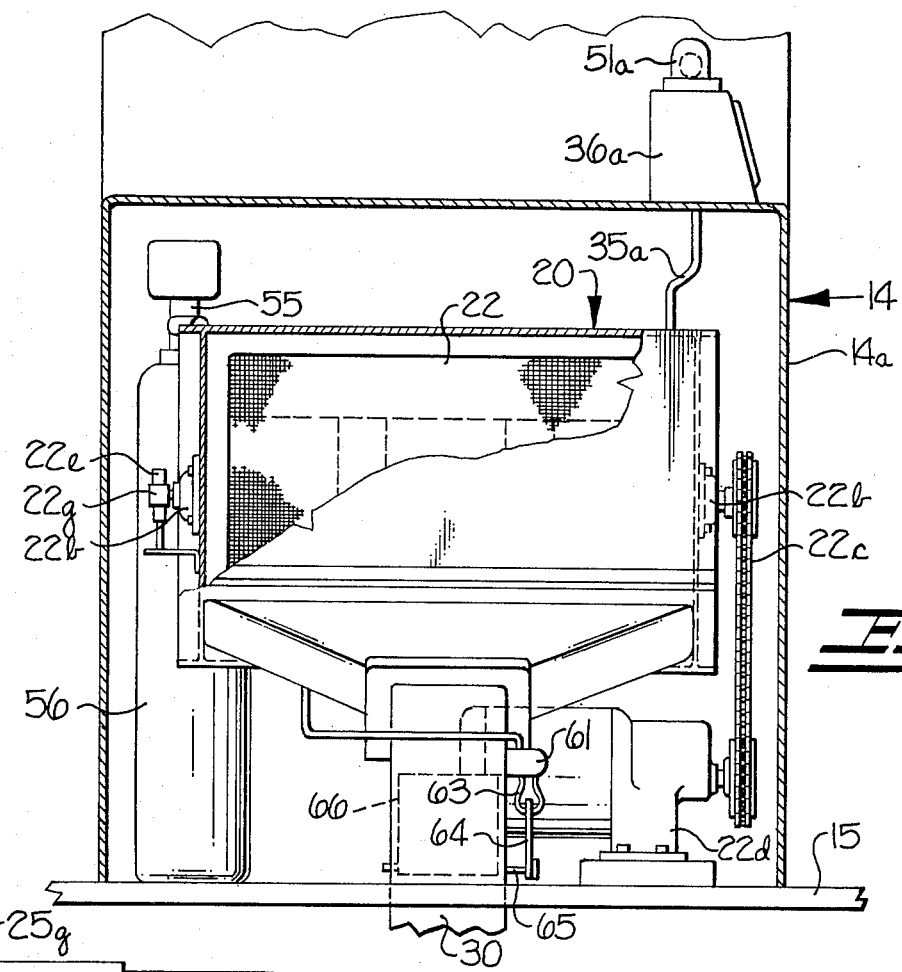
FIG. 5 is an outer end elevation of a suitable primary filter unit, partially in section and with parts broken away, taken substantially along line 5—5 in FIG. 3.

One end of each open-end spinning machine 10, has a primary filter unit 14 attached thereto which is in the form of a housing 14a into which one end of the duct 12 of the corresponding open-end spinning machine extends. As shown in FIGS. 3, 4 and 5, housing 14a of each primary filter unit 14 is of generally rectangular form in plan and in elevation and may be mounted upon a floor 15 upon which the open-end spinning machines are supported or upon any convenient support means. The housing 14a of FIGS. 3, 4 and 5 is suitably attached to the corresponding end of the open-end spinning frame 10.

The rear or upstream end of each suction duct 12 may be closed, as indicated in the right-hand portion of FIG. 3, so that suction causes air to flow into duct 12 closely adjacent or through each spinning unit 11 of the respective machine 10. Also, the forward or downstream of each duct 12 is communicatively connected to the rear end of a respective primary filter box or air flow channel 20 suitably supported within housing 14a and which may be of any desired shape. Preferably, filter box 20 is of polygonal shape in elevation and of substantially rectangular shape in plan.

A primary filter is disposed within each filter box 20 and is preferably in a form of substantially flat, rectangular filter 22. The substantially rectangular frame of filter 22 may be provided with suitable yieldable seals, not shown, which engage the upper and lower walls of filter box 20 when primary filter 22 occupies the substantially vertical, closed, position shown in FIGS. 3 and 5. Additionally, it is preferred that opposite ends of the frame of primary filter 22 are disposed normally in close proximity to or in sealing engagement with opposite side walls of filter box 20.

The cross-sectional area of primary filter box 20, and the surface area of the respective filter 22 is substantially greater than that of each respective duct 12. The downstream end of filter box 20 is communicatively connected to the upstream side of a secondary filter unit remote from and common to all of the machines 10 and the primary filters 22 thereof. As shown in FIGS. 1, 2, 6 and 7, the common secondary filter unit comprises a common secondary filter box 25.

Depending upon the number of open-end spinning machines in the textile room, some or all of the machines may be connected to a common source of suction. As shown by way of example in FIG. 1, the primary filter boxes 20 of the six machines in group A are connected to the suction side of a first common suction blower 26 or fan means, and preferably the primary filter boxes 20 of a like number of machines in group B, only five of which are shown in this instance, are connected to the suction side of a second common suction blower 26a or fan means. The exhaust sides of both suction blowers 26, 26a are shown communicatively connected to the upstream side of the secondary filter box 25.

Referring again to FIGS. 3 and 5 it will be observed that the downstream or outer end of the primary filter box 20 there shown is connected to the corresponging suction blower 26 (FIG. 1) by means of a respective branch duct 30 which may extend upwardly to an overhead conduit, but is shown, by way of example, extending downwardly into the floor 15 where it is connected to another branch duct 31. Branch duct 31 is common to all of the machines 10 in group A (FIG. 1) and thereby serves as a manifold for connecting the downstream ends of all of the filter boxes 20 associated with the machines in group A to a common pneumatic conveyor conduit 32. Conduit 32 may extend beneath the floor 15 as shown in FIGS. 1 and 2 and then may extend upwardly through the floor adjacent the suction blower 26 where it is communicatively connected to the suction side of suction blower 26. The exhaust side of suction blower 26 has a conduit 33 extending upwardly therefrom and communicatively connecting suction blower 26 to the upstream side of secondary filter box 25.

The primary filter boxes 20 associated with the open-end spinning machines 10 in group B are connected to the suction side of the second suction blower 26a by means of branch duct 31a and pneumatic conveyor conduit 32a which correspond to the duct 31 and conduit 32 associated with the machines in group A. Also, a conduit 33a connects the exhaust side of second suction blower 26a to the upstream side of secondary filter box 25.

Referring again to the primary filter box 20 of FIGS. 3, 4 and 5, it is apparent that the primary filter 22 therein normally serves as an arresting filter interposed in the channel defined by the filter box 20 between duct 12 and the conduit means 30, 31, 32 through which the air flows in its course from the open-end spinning units of the corresponding machine 10 through suction blower 26 and through secondary filter box 25. Now, in order for any of the known types of open-end spinning machines having rotor-type spinning units to operate efficiently and to produce yarn of the desired quality, it is essential that the pressure of the spinning air through each spinning unit is maintained at a substantially constant pressure within close limits.

In the case of most known open-end spinning machines, it has been determined that the optimum static gauge pressure of the air flow through each spinning unit or rotor should be 18 inches of water at about 3.5 to 7 cubic feet per minute, and such pressure should not be less than 17 inches of water to obtain acceptable yarn and to prevent the occurrence of excessive ends-down conditions.

Therefore, in order to maintain a substantially constant suction flow of spinning air through the rotors of each open-end spinning machine during normal operation thereof, means are provided for supporting and rotating each primary filter 22 to periodically dislodge fiber waste entrapped thereagainst into the air flow downstream thereof so that the dislodged fiber waste is conveyed to the secondary filter box 25. The term "periodically" is used herein with respect to the operation of each primary filter to mean that each primary filter may be operated at spaced intervals of uniform or random duration just so long as fiber waste collected thereon is dislodged at sufficiently frequent intervals so as to ensure efficient flow of air past or through the respective spinning units.

Accordingly, each primary filter 22 is rotatably mounted on an axis extending across the flow of air through the channel defined by the respective filter box 20. More specifically, it will be observed in FIG. 3 that a central portion of filter 22 is fixedly mounted on a shaft 22a journaled is suitable bearings 22b (FIGS. 4 and 5) carried by opposing side walls of filter box 20. One end of shaft 22a is connected, as by suitable sprocket and chain connections 22c, to the shaft of an electric motor 22d which may be suitably secured to the floor 15 within the respective housing 14a. As will be presently described, means are provided for periodically energizing electric motor 22d for intervals of such duration that the primary filter 22 will move through substantially one-half a revolution and thus normally will be inverted with respect to the direction of the air flow each time electric motor 22d is energized.

During normal operation of each textile machine 10, it is preferred that the primary filter 22 thereof is inverted automatically at predetermined intervals either under control of a suitable timing device or a pressure responsive means which is actuated upon an undesirable or abnormal pressure condition occurring within the respective filter box 20. Accordingly, it will be observed in the upper portion of FIG. 7 that there is provided an electrical circuit enclosed in a block defined by dotted lines and indicated at 14b, this electrical circuit 14b being the circuit provided for the particular machine 10 shown in FIGS. 3, 4 and 5. In the central portion of FIG. 7, the five blocks indicated at 14b' represent similar electric circuits for each of the five remaining textile machines 10 in the group A. It is to be understood that similar electrical circuits also are provided for the respective machines 10 in group B of FIG. 1.

As shown in FIGS. 3 and 5 and in the upper portion of FIG. 7, the filter box 20 for each textile machine 10 has a suitable pressure sensing device 35 therein which is shown positioned adjacent the upstream side of the respective primary filter 22, but which may be positioned adjacent the downstream side of filter 22 if desired. In any event, if a timing device is not used for controlling motor 22d, the pressure sensing device 35 is employed and should be capable of effecting actuation of a normally inactive pressure responsive switch 36 upon an undesirable pressure drop or reduction in the suction air flow through duct 12 and filter box 20 occurring as a result of an excessive amount of lint being entrapped against the upstream side of the respective primary filter 22. It will be observed in FIGS. 3, 5 and 7 that pressure sensing device 35 is communicatively connected to pressure responsive switch 36 by a tubular member 35a which extends upwardly from primary filter box 20 in FIGS. 3 and 5 and is connected to a suitable control box 36a mounted on the main filter box housing 14a. Control box 36a may contain the respective pressure responsive switch 36 and other elements of the electrical circuit shown within the block 14b defined by the broken lines in FIG. 7.

Referring to the upper portion of the broken-line block 14b in FIG. 7, it is apparent that actuation of the normally inactive pressure responsive switch 36 energizes a coil of a normally inactive electromagnetic relay 40 to close a pair of normally open contact sets 40a, 40b thereof. It will be noted that contact set 40a then establishes a holding circuit for the coil of relay 40 as contact set 40b normally completes a circuit to the coil of an electromagnetic filter motor relay 41. The normally open contact sets of relay 41 then complete a circuit to electric motor 22d to impart rotation to the corresponding primary filter 22.

Since suction blower 26 then is operating (FIG. 2), it follows that the air flowing through filter box 20 will immediately start dislodging the previously entrapped fiber waste from the upstream side of the primary filter 22 as the upstream side thereof moves to the downstream position and, of course, most if not all of the previously collected fiber waste will be blown off the filter 22 when it is completely inverted and all of the air from duct 12 then flows through filter 22. As filter 22 approaches the end of one-half a revolution in rotation thereof, the high point of a cam 22e, fixed on one end of the shaft 22a of filter 22, momentarily moves into engagement with and then beyond a normally closed push button switch 22g.

Switch 22g is interposed in the electrical holding circuit to the coil of relay 40 and thus deenergizes the coil of relay 40 to interrupt the operation of electric motor 22d. It is apparent that the pressure within filter box 20 will have returned to the desired normal operating pressure by the time the primary filter 22 has returned to the closed or substantially vertical position shown in FIGS. 3 and 5 so that pressure responsive switch 36 will have returned to its normally opened state.

Figure 6:
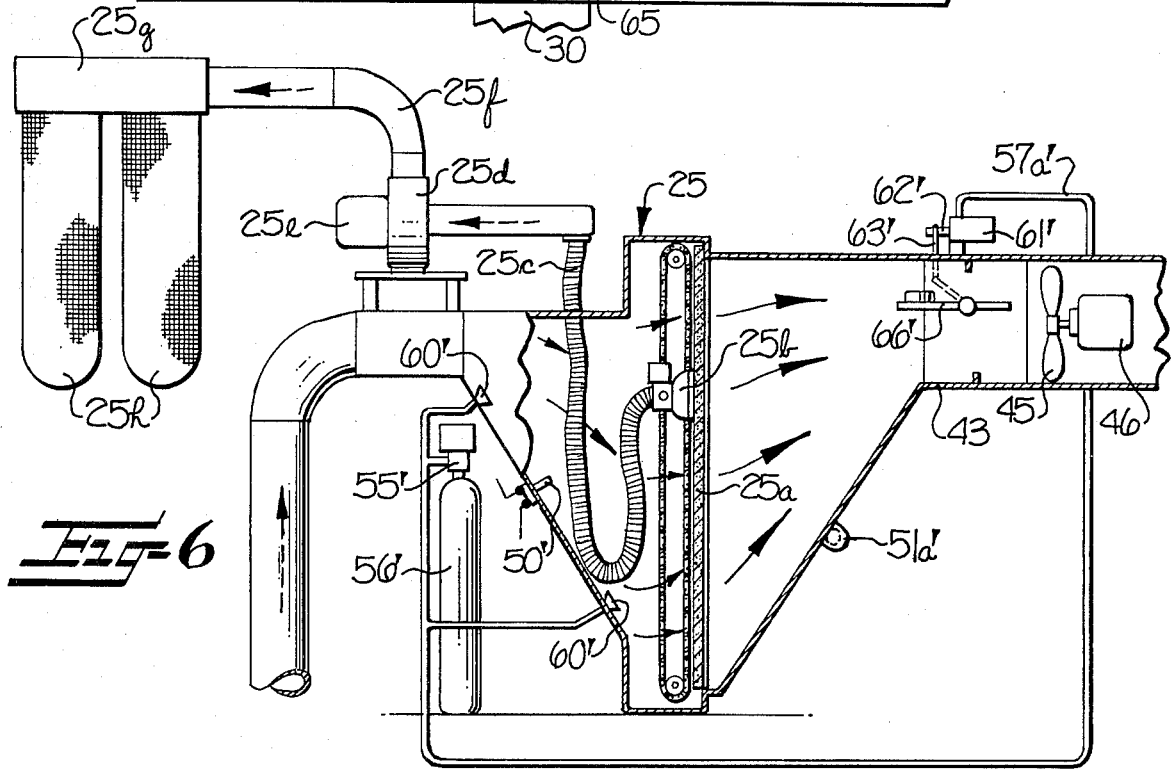
FIG. 6 is an enlarged elevation, with parts broken away and in section, showing details of the common secondary filter unit shown in the upper left-hand portion of FIG. 2.

As heretofore indicated, the air flow induced by suction blowers 26, 26a produces an air flow through the duct 12 and primary filter box 20 associated with each textile machine 10 in the respective groups A, B (FIG. 1) so that, as each primary filter 22 is inverted, the fiber waste dislodged therefrom is pneumatically conveyed through the corresponding suction blowers 26, 26a and exhaust conduits 33, 33a into the secondary filter box 25 and against a secondary filter 25a therein (FIG. 6). As shown, secondary filter 25a is in the form of a substantially flat rectangular filter medium in FIG. 6 with its downstream side communicating with the ingress or upstream end of an air distributing duct system 43. If desired, instead of utilizing a flat filter medium such as that shown in FIG. 6, secondary filter 25a may take the form of a drum-like rotary filter apparatus such as is disclosed, for example, in U.S. Pat. No. 3,628,313, issued to Arnold Broadbent on Dec. 12, 1971.

It is apparent that the surface area of secondary filter 25a should be sufficient to receive the fiber waste being generated by all of the textile machines whose filter boxes 20 communicate with common secondary filter box 25. During operation of the apparatus, fiber waste is continuously removed from the upstream side of secondary filter 25a by any suitable means such as is shown in the form of a traversing suction nozzle or vacuum nozzle 25b (FIGS. 2, 6 and 7) to which one end of a flexible suction tube 25c is communicatively connected. The other end of suction tube 25c is connected to the suction side of a filter cleaning suction blower 25d driven by an electric motor 25e disposed exteriorly of secondary filter box 25.

An exhaust duct 25f (FIGS. 1, 2 and 6) is connected to the exhaust side of suction blower 25d and also is connected to a manifold 25g from which a pair of air pervious filter bags or socks 25h are suspended for receiving therein the fiber waste sucked from the upstream surface of secondary filter 25a by vacuum nozzle 25b. It is apparent that filter bags 25h may be alternatively removed from manifold 25g for emptying the same at sufficiently frequent intervals to ensure that suction nozzle 25b will maintain the upstream side of secondary filter 25a in a substantially clean condition.

Since the use of such filter bags is well-known in the textile industry, a further detailed description thereof is deemed unnecessary. However, reference is made to U.S. Pat. No. 2,500,123, which issued on Mar. 7, 1950 to E. C. Gwaltney et al., for a disclosure of a manifold and suspended filter bags comparable to the manifold 25g and filter bags 25h of FIGS. 1, 2 and 6. Also, since it is well-known in the textile industry to utilize traversing suction nozzles for cleaning filters, a more detailed description of the filter 25a and suction nozzle 25b of FIG. 6 is deemed unnecessary. However, reference is made to Sherrill's U.S. Pat. No. 3,303,635, dated Feb. 14, 1967, for a disclosure of a suitable filter and associated traversing suction nozzle of the general type shown in FIG. 6.

The air distributing conduit or duct 43 (FIGS. 1 and 2) is provided with suitable outlets 44 and may be positioned in any desired location for distributing the cleaned air being exhausted from the region of secondary filter box 25 back into the spinning room. As shown, by way of example, air distributing conduit 43 is disposed in an overhead area of the spinning room adjacent one end of the row of open-end spinning machines 10. It is desirable that the static air pressure is substantially the same on both sides of the secondary filter 25a. Accordingly, the ingress or upstream end of distributor conduit 43 has a suitable axial flow fan 45 mounted therein driven by an electric motor 46. Thus, it can be seen that the air being sucked through the strand processing units 11 of the textile machines 10 in groups A, B by the respective suction blowers 26, 26a is filtered and then distributed back into the spinning room through distributing conduit 43.

As indicated earlier herein, in the event of the occurrence of a fire in the fiber waste being entrapped against the primary filter 22 of any one or more of the machines 10, that machine will be shut down, the air flow therethrough will be cut off and any burning fiber waste will be extinguished without adversely affecting the operation of any of the remaining strand processing machines. Additionally, in the event of the occurrence of a fire in the fiber waste being entrapped against secondary filter 25a, all of the machines whose filter boxes communicate with secondary filter 25a will be shut down, the air flow therethrough will be cut off and the burning fiber waste will be extinguished adjacent the secondary filter. In the latter instance, the air flow into the distributor conduit 43 also will be interrupted. In this regard, it should be noted that a very important reason why a separate rotatable filter 22 is provided for each machine 10, in addition to the common secondary filter 25a, is to ensure that the fiber waste generated by each textile machine is arrested at intervals of such duration that the occurrence of any burning condition; i.e., fire, spark or smoldering condition, of the fiber waste at that particular machine 10 may be readily detected by automatic means. Therefore, each of the primary filter units 14, as well as the secondary filter box 25, is equipped with a respective flame and/or smoke sensing means and a related circuit for effecting the various operations last mentioned so as to prevent the occurrence of a configuration as a result of the occurrence of a fire in the fiber waste adjacent any of the filters 22 or 25a.

Referring to FIGS. 3 and 7 it will be observed that the upper portion of the filter box 20 there shown has a suitable sensing device 50 capable of detecting and producing an electrical impulse or signal upon the occurrence of a fire in the fiber waste adjacent and/or against the upstream side of filter 22. Although sensing device 50 should be capable of sensing the occurrence of either or both a flame and a smoking condition in the vicinity thereof, it will be termed hereinafter in the generic sense as a "fire" sensing device or detector for the purpose of this disclosure. Various types of fire sensing devices may be used. However, it has been found that the most efficient fire sensing device which may be used with open-end spinning machines is an infrared sensitive cell which will quickly detect a spark or flame which may have been generated at any one of the rotors or spinning units of the respective textile open-end spinning machine and conveyed along the duct 12 into primary filter box 20.

It is important to note that, if the primary filters 22 and corresponding fire sensing and responsive equipment were not provided for each individual textile machine but, instead, any burning condition were only to be sensed at the common filter embodied in filter box 25, this would require that the fire sensing device associated with the filter box 25 be effective to stop the operation of the main suction fans or suction blowers 26, 26a, along with stopping all of the open-end spinning machines, and would result in a considerable loss of production. Such a condition could occur simply as a result of a spark emanating from a single spinning unit 11. However, this problem is substantially eliminated by providing the separate primary filter 22 and associated fire sensing device 50 and related equipment at each of the textile machines 10.

As shown in the upper portion of FIG. 7, upon any fire being sensed by the respective fire sensing device 50, the electrical impulse thus produced is amplified through a suitable amplifier 51 to energize a suitable warning signal, such as a lamp 51a, and the coil of an electromagnetic relay 52 to change the state of the contact sets 52a, 52b, 52c thereof. In so doing, flow of current to the coil of the respective filter motor relay 41 and to the coil of a main drive motor relay 53 would be interrupted to stop the filter driving motor 22d, if it had been previously energized, and also to stop the main drive motor 10a of the respective open-end spinning machine, thus stopping the operation of the rotors of all of the spinning units 11 of the respective machine 10. The warning lamp 51a may be conveniently mounted on the respective control box 36a (FIGS. 3 and 5) so as to be readily observed by an operator.

At the same time that the energization of the coil of relay 52 effects interruption of the operation of the motors 10a, 22d, the contact set 52c of relay 52 is closed to energize the coil of a normally inactive or normally closed solenoid valve 55 associated with a container 56 of a pressurized fire extinguishing material which may be in the form of a liquid chemical, powder or gas. For example, container 56 may contain a supply of pressurized carbon dioxide gas. A separate container 56 is positioned in each filter box containing housing 14a (FIG. 3). Thus, upon energization of the coil of solenoid valve 55 (FIG. 7), the pressurized fire extinguishing material flows from the respective container 56 through a pressure line or conduit 57 to one or more discharge nozzles 60 positioned in the respective primary filter box 20 so as to subject the entire interior of the respective filter box 20 to the fire extinguishing material and thereby to extinguish the burning fiber waste therein.

At the instant that the fire extinguishing material is flowing to the nozzle 60, it is also flowing through a branch conduit 57a from conduit 57 to a damper control unit shown in the form of a cylinder 61 suitably secured to the respective branch duct 30. Cylinder 61 has a piston 61a therein to which a piston rod or plunger 62 is connected and which normally is biased outwardly or to the right in FIG. 7 by a suitable spring 61b. The free end of piston rod 62 is normally extended and loosely supports thereon a suitable loop or cord 63 whose lower end is connected to a crank 64. Crank 64 extends downwardly and is fixed on one end of a shaft 65 which may extend through the branch duct 30 and has one edge portion of a damper or flapper valve 66 secured thereon.

Thus, whenever the solenoid valve 55 is opened and permits the pressurized fire extinguishing material to flow along the pressure line 57 and branch line 57a into the right-hand end of cylinder 61 in FIG. 7, the pressurized fire extinguishing material causes plunger 62 to move from right to left and thereby withdraw from the loop or cord 63. Thereupon, the weight of crank 64 and the flapper valve or damper 66 causes the same to move downwardly by gravity and thereby to close the branch duct or conduit 30. It is apparent that this interrupts the flow of air through the corresponding duct 12 and the filter box 20 at substantially the same instant that the drive motor 10a for the corresponding open-end spinning machine 10 is stopped. Also, damper 66 then avoids loss of the fire extinguishing material from the respective primary filter box 20 along ducts 30–33. From the foregoing description, it can be appreciated that, upon a fire or other burning condition being sensed by the sensing device 50, communication between the respective filter box 20 and the secondary filter box 25 is interrupted, the flow of air through the corresponding suction duct 12 and primary filter 22 is interrupted, the respective filter drive motor 22d, if then active, is inactivated, and the operation of the strand processing units of the corresponding textile machine 10 are interrupted without interfering with the operation of the remaining machines in groups A and B, it being understood that each of the blocks 14*b'* below the broken-line block 14*b* in FIG. 7 may represent a circuit identical to that shown in the upper portion of FIG. 7 for each of the respective remaining textile machines 10 shown in FIG. 1.

Referring now to FIG. 6 and the lower portion of FIG. 7, it will be observed that the secondary filter box 25 also is provided with a fire sensing device 50' and a pair of fire extinguisher nozzles 60' which may be identical to and function in essentially the same manner as the fire sensing device 50 and the fire extinguisher nozzle 60 associated with each primary filter box 20. Accordingly, where applicable, those parts of the circuit of FIG. 7 adjacent the secondary filter box 25 which correspond to similar parts adjacent each of the primary filter boxes 20 will bear the same reference characters with the prime notation added, in order to avoid repetitive description.

The circuit of FIG. 7 is so arranged that when a manually operable master switch 70 is closed, a main relay 71 closes the circuit to lead conductors 72, 73, 74 which, in turn, normally establish a circuit to three respective conductors 75, 76, 77 from which a set of three conductors 80, 81, 82 leads to each of the circuits 14*b*, 14*b'* of the textile machines 10. An electromagnetic relay 84 has three normally closed contact sets *a*, *b*, *c* which normally establish contact between conductors 73–74 and the respective conductors 75–77.

Thus, whenever a set of three manually operable switches 85–87 associated with each machine 10 occupies close position, the circuit associated with each respective machine 10 will operate in the manner described with respect to the upper portion of FIG. 7. However, upon the sensing of a fire by the fire sensing device 50' associated with secondary filter box 25, the signal generated by sensing device 50' will be amplified by amplifier 51' to in turn, energize warning device or lamp 51*a'* as well as the coil of relay 84. In so doing, the normally closed contact sets *a–c* of relay 84 are opened to interrupt the circuit to all of the textile machines 10 while also interrupting the electrical circuit to all four of the suction blower or fan motors 26*b*, 26*b*, 25*e*, 46 so that the operation of all of the air circulating fans in the entire system is interrupted as well as the operation of the drive motors 10*a* and the filter rotating motors 22*d* associated with all of the textile machines 10 of FIG. 1.

At the same time that any fire in the fiber waste is detected by sensing device 50' in the secondary filter box 25, it should be noted that the consequent energization of the coil of relay 84 also closes a normally open contact set *d* interposed in an electrical circuit to the coil of solenoid valve 55' while establishing a holding circuit for the coil of relay 84. Thus, solenoid valve 55' functions in the same manner as solenoid valve 55 to cause pressurized fire extinguishing material to be exhausted from the nozzles 60' to extinguish the burning fiber waste within secondary filter box 25. Also, the flow of fluid pressure from container 56' into the cylinder 61' (FIG. 7) causes the plunger 62' thereof to withdraw from engagement with a loop or cord 63' which functions in the same manner as the cord 63 in the upper portion of FIG. 7. Thus, a normally open damper 66' is released to close the upstream end of air distributing conduit or duct 43 so that any burning fiber waste in secondary filter box 25 will not be conveyed along air distributing duct 43. It is to be noted that stripper fan 25*e* and recirculation fan 45 also are inactive when all of the machines 10 are stopped by activation of relay 84.

Upon the fire being extinguished in secondary filter box 25, the holding circuit to the coil of relay 84 may be opened by operation of a manually operable normally closed push button switch 86 interposed in the holding circuit to the coil relay 84. Operation of all of the machines 10 then may be resumed. It can be appreciated that, since the relay 84 interrupted the circuit to all of the open-end spinning machines 10 at the same time that the operation of the suction blowers 26, 26*a* was interrupted, the ends of yarn being processed on the spinning machines will have broken due to the stopping of the spinning rotors and the lack of a suction air flow therethrough. All of the machines 10 may be started following the extinguishing of the fire in secondary filter box 25.

As a non-limiting example of actual use of the apparatus of this invention in a typical installation, a group of six open-end spinning machines was arranged and connected to a suction fan and a secondary filter in substantially the manner described herein with respect to the group A of machines 10 in FIG. 1. The capacity of the suction blower or fan 26 was such as to provide a suction level of about −29 inches static water gauge pressure (S.W.G.) at the inlet thereof. With each of the six machines 10 of group A having 150 open-end spinning units 11 or rotors, the suction in each duct 12 was about −25 inches S.W.G., producing a suction of −18 inches S.W.G. through the rotor of each open-end spinning unit 11. The arresting filters 22 were controlled so as to have the collected fiber waste removed therefrom at sufficiently frequent intervals so as to avoid any noticeable change in the air flow through each rotor, at least to the extent that a suction static of at least −17 inches S.W.G. was maintained at each rotor at all times during normal operation of the six machines.

Tests have shown that, upon detection of a fire adjacent any one of the primary filters 22, the respective machine 10 was shut off and the fire was extinguished, in the manner heretofore described, immediately following such fire detection. Also, although the damper 66 associated with the respective machine 10 was released and permitted to close very nearly at the instant that the fire was detected, this had very little affect on the operation of the remaining machines 10 of group A with the exception of a slight increase in suction occurring at the rotors of the remaining machines.

It is thus seen that we have provided an effective method and apparatus for maintaining a substantially constant flow of spinning air through the rotors of all of the open-end spinning machines during normal operation thereof while effectively disposing of fiber waste generated as an incident of the operation of the rotors, and wherein, upon the occurrence of a fire in the fiber waste filter box of any one of the machines, the fire will be detected and extinguished and the respective machine will be stopped without interrupting the operation of the remaining machines, even though some or all of the machines are connected to a common source of suction for producing the spinning air required at the rotors.

In the drawings and specification, there has been set forth a preferred embodiment of the invention, and although specific terms are employed, they are used in a generic and descriptive sense only and not for pur- That which is claimed is:

1. A method of collecting fiber waste generated as an incident of the operation of a plurality of rotor-type spinning units of each of a plurality of open-end spinning machines while normally maintaining adequate spinning air flow therethrough, and for preventing a conflagration in the event of a fire in the fiber waste being collected, said method comprising effecting a suction spinning air flow at the spinning units of each machine and into a respective duct communicating therewith by producing a suction airstream at an area downstream of and communicating with all of the respective ducts so that air flows along the ducts toward such area and through a separate primary filter for each duct, while entrapping fiber waste from the spinning units against the respective primary filters, periodically dislodging the entrapped fiber waste from the primary filters and causing the fiber waste being dislodged to be entrained in the air flow downstream of each respective primary filter, directing the thus dislodged and entrained fiber waste downstream to and against the upstream side of a secondary filter common to and downstream of all of the primary filters as the air flows through the secondary filter, removing the collected fiber waste from the secondary filter, sensing the occurrence of a fire in the fiber waste while it is being entrapped by any of the primary filters and in response thereto interrupting the air flow through the duct and the primary filter of the respective machine without interrupting the air flow through the ducts and primary filters of the remaining machines so that the burning fiber waste will be prevented from being borne downstream to the secondary filter by the air flow during the operation of the remaining machines.

2. A method according to claim 1, which includes interrupting the operation of the rotor-type spinning units of the respective machine in response to said sensing of the occurrence of a fire adjacent the respective primary filter.

3. A method according to claim 1, which also comprises extinguishing the burning entrapped fiber waste in response to the sensing of the occurrence of a fire adjacent the respective primary filter.

4. A method according to claim 1, which includes interrupting the operation of the spinning units of the respective machine and extinguishing the burning fiber waste in response to the sensing of the occurrence of a fire adjacent the respective primary filter.

5. A method according to claim 4, further comprising the steps of sensing the occurrence of a fire in the fiber waste lodged against the upstream side of the secondary filter and in response thereto interrupting the operation of the spinning units of all of the machines while also interrupting the production of the suction airstream.

6. A method according to claim 5, which includes extinguishing any burning fiber waste lodged against the secondary filter in response to said sensing of the occurrence of a fire adjacent the secondary filter.

7. A method according to claim 1, in which the steps of periodically dislodging fiber waste from the primary filters and directing the dislodged fiber waste downstream to the common secondary filter include periodically changing the position of each primary filter to cause fiber waste entrapped against one side thereof to be removed by the air flow.

8. A method according to claim 1, in which the steps of periodically dislodging fiber waste from the primary filters and directing the dislodged fiber waste downstream to the common secondary filter comprise periodically inverting each primary filter so that fiber waste entrapped against one side thereof is removed therefrom by the air flow through the respective primary filter as other fiber waste from the spinning units of the respective machine is being entrapped against the other side of the respective primary filter.

9. A method according to claim 1, in which the step of removing the collected fiber waste from the secondary filter comprises continuously removing collected fiber waste from the secondary filter during operation of the textile machines.

10. A method of collecting fiber waste generated as an incident of the operation of a plurality of yarn spinning rotors of each of a plurality of open-end spinning machines and for preventing a conflagration in the event of a fire in the fiber waste being collected, said method comprising effecting a suction spinning air flow at the rotors of each machine and into a respective duct communicating therewith by producing a suction airstream at an area downstream of and communicating with all of the respective ducts so that air flows along the ducts toward such area and through a separate primary filter for each duct, while entrapping fiber waste from the rotors against the respective primary filters, periodically changing the position of each primary filter to cause fiber waste entrapped against one side thereof to be removed by the air flow without significantly reducing the spinning air flow at the rotors of the respective machine, directing the thus removed fiber waste downstream to and against the upstream side of a secondary filter common to and downstream of all of the primary filters as the air flows through the secondary filter, removing the collected fiber waste from the secondary filter, sensing the occurrence of a fire in the fiber waste while it is being entrapped by any of the primary filters and in response thereto (a) interrupting the operation of the rotors of the respective machine, (b) extinguishing the fire in the fiber waste adjacent the respective primary filter, and (c) interrupting the air flow through the duct and the primary filter of the respective machine without interrupting the operation of the remaining machines and without significantly reducing or interrupting the air flow through the ducts and primary filters of the remaining machines and so that the burning fiber waste will be prevented from being borne downstream to the secondary filter by the air flow during the operation of the remaining machines.

11. A method of collecting fiber waste generated as an incident of the operation of a plurality of rotor-type yarn spinning units of each of a plurality of open-end spinning machines, said method comprising effecting a suction spinning air flow at the spinning units of each machine and into a respective duct communicating therewith by producing a suction airstream at an area downstream of and communicating with all of the respective ducts so that air flows along the ducts toward such area and through a separate primary filter for each duct, while entrapping fiber waste from the spinning units against the respective primary filters, periodically dislodging the entrapped fiber waste from the primary filters and causing the fiber waste being dislodged to be entrained in the airflow downstream of each respective primary filter without significant reduction in the spinning air flow, directing the thus dislodged and entrained fiber waste downstream to and against the upstream side of a secondary filter common to and downstream of all of the primary filters as the air flows through the secondary filter, and removing the collected fiber waste from the secondary filter.

12. A method according to claim 11, which includes sensing the occurrence of a fire in the fiber waste while it is entrapped by any of the primary filters and in response thereto interrupting communication between the respective primary filter and the secondary filter without interrupting communication between the remaining primary filters and the secondary filter so that the burning fiber waste will be prevented from being borne downstream from the respective primary filter to the secondary filter by the air flow during the operation of the remaining machines.

13. A method according to claim 12, which includes interrupting the operation of the spinning units of the respective machine in response to the sensing of the occurrence of a fire adjacent the respective primary filter, and also extinguishing such fire in response to the sensing thereof.

14. A method according to claim 11, in which the steps of periodically dislodging fiber waste from the primary filters and directing the dislodged fiber waste downstream to the common secondary filter include periodically changing the position of each primary filter to cause fiber waste entrapped against one side thereof to be removed by the air flow.

15. A method according to claim 11, in which the steps of periodically dislodging fiber waste from the primary filters and directing the dislodged fiber waste downstream to the common secondary filter comprise periodically inverting each primary filter so that fiber waste entrapped against one side thereof is removed therefrom by the air flow through the respective primary filter as other fiber waste from the spinning units of the respective machine is being entrapped against the other side of the respective primary filter.

16. A method according to claim 15, wherein each inverting of each of the primary filters comprises rotating the same substantially one-half a revolution about an axis extending across the direction of the air flow.

17. A method according to claim 15, in which the step of periodically inverting each primary filter comprises inverting the same following each predetermined period of flow of the air through the respective primary filter.

18. A method according to claim 15, which includes detecting air pressure adjacent each of the primary filters, and wherein the step of periodically inverting each primary filter comprises inverting the same in response to the detection of a predetermined air pressure condition adjacent the respective primary filter incident to the build-up of fiber waste against the then upstream side of the respective primary filter.

19. A method according to claim 11, in which the step of removing the collected fiber waste from the secondary filter comprises continuously removing collected fiber waste from the secondary filter during operation of the textile machines.

20. Apparatus for removing fiber waste from a plurality of rotor-type spinning units of each of a plurality of open-end spinning machines while normally maintaining an adequate spinning air flow through each spinning unit and preventing a conflagration in the event of a fire in the fiber waste being collected, said apparatus comprising a fiber conveying air duct for each machine communicating with the respective spinning units thereof, a common fan means communicating with and effecting suction air flow along all of said air ducts, means defining an air flow channel between each duct and said common fan means and effecting communication therebetween, a primary filter in each air flow channel for entrapping fiber waste thereagainst as the air flows therethrough, a secondary filter downstream of and common to all of said primary filters, means mounting each primary filter for movement relative to the respective air flow channel for permitting periodically changing the position of each primary filter so that the air flow through the respective channel may dislodge fiber waste from the respective primary filter and convey the dislodged fiber waste to said common secondary filter, means operatively associated with said secondary filter for removing collected fiber waste therefrom during operation of the textile machine, sensing means adjacent each primary filter for sensing the occurrence of any fire in the fiber waste in the respective channel, and means responsive to the sensing of such a fire for interrupting the suction air flow along the duct and through the channel and the primary filter of the respective machine without reducing or interrupting the air flow through the ducts and primary filters of the remaining machines to thereby prevent any burning fiber waste from being borne to the secondary filter by the air flow during the operation of the remaining machines.

21. Apparatus according to claim 20, including means for driving the spinning units of each machine, and means responsive to said sensing means and operatively connected to said driving means for interrupting the operation of the spinning units of the respective machine upon the fire in the fiber waste being sensed.

22. Apparatus according to claim 20, including a normally inactive fire extinguishing means adjacent each primary filter, and means responsive to the sensing of a fire in the fiber waste in any of said channels by the respective sensing means for activating said fire extinguishing means to extinguish the fire in the respective channel.

23. Apparatus according to claim 20, including a secondary sensing means adjacent said secondary filter for sensing the occurrence of a fire adjacent said secondary filter, a normally inactive fire extinguishing means adjacent said secondary filter, and means operatively connecting said secondary sensing means to said fire extinguishing means for extinguishing any burning fiber waste adjacent said secondary filter in response to said sensing of a fire by said secondary sensing means.

24. Apparatus according to claim 20, including a secondary sensing means adjacent said secondary filter for sensing the occurrence of a fire in fiber waste adjacent said secondary filter, means for driving the spinning units of each machine, and means responsive to the sensing of a fire by said secondary sensing means, and being operatively connected to said driving means of all of the machines, for interrupting the operation of the spinning units of all of the machines.

25. Apparatus according to claim 24, including means operatively connecting said secondary sensing means to said fan means and being respective to the sensing of a fire by said secondary sensing means for interrupting operation of said fan means.

26. Apparatus according to claim 20, wherein each primary filter normally extends across the respective channel so that the air must flow therethrough, normally inactive means for rotating each primary filter about an axis substantially perpendicular to the air flow through the respective channel, and means for periodically activating each normally inactive rotating means to invert the respective primary filter with respect to the air flow through the respective channel so that the fiber waste previously collected on the upstream side of each primary filter will be dislodged thereform upon inversion thereof.

27. Apparatus according to claim 20, wherein said means for interrupting the suction air flow along the duct and through the channel and the primary filter of the respective machine comprises means for interrupting communication between the last-named channel and the secondary filter at a location downstream of the respective primary filter without interrupting communication between the remaining channels and the secondary filter.

28. Apparatus for removing fiber waste from a plurality of normally operating yarn spinning rotors of each of a plurality of open-end spinning textile machines and for preventing a conflagration in the event of a fire in the fiber waste being collected, said apparatus comprising a fiber conveying air duct for each machine communicating with the respective rotors thereof, a common fan means communicating with and effecting a suction spinning air flow along all of said air ducts, means defining an air flow channel between each duct and said common fan means and effecting communication therebetween, a primary filter in each air flow channel for entrapping fiber waste thereagainst as the air flows therethrough, a secondary filter downstream of and common to all of said primary filters, means mounting each primary filter for movement in the respective air flow channel, means for periodically changing the position of each primary filter such as to cause the air flow through the respective channel to dislodge fiber waste from the respective primary filter and convey the dislodged fiber waste to said secondary filter without significantly reducing the spinning air flow along the respective duct, means for removing collected fiber waste from said secondary filter during operation of the textile machines, a normally inactive fire extinguishing means communicating with each channel, sensing means adjacent each primary filter for sensing the occurrence of a fire in the fiber waste in the respective channel, and means responsive to the sensing of such a fire by the respective sensing means for (a) interrupting the operation of the rotors of the respective machine, (b) activating the respective fire extinguishing means and (c) interrupting communication between the respective channel and said fan means so as to extinguish the fire and interrupt the suction air flow along the duct and through the channel and the primary filter of the respective machine without reducing or interrupting the spinning air flow through the ducts and primary filters of the remaining machines to thereby prevent any burning fiber waste from being borne to the secondary filter by the air flow during the operation of the remaining machines.

29. Apparatus for removing fiber waste from a plurality of rotor-type spinning units of each of a plurality of open-end spinning textile machines while normally maintaining an adequate spinning air flow through each spinning unit, said apparatus comprising a fiber conveying air duct for each machine communicating with the respective spinning units thereof, a common fan means communicating with and effecting suction air flow along all of said ducts, means defining an air flow channel communicating with and positioned between each duct and said common fan means, a primary filter in each air flow channel for entrapping fiber waste thereagainst as the air flows through the respective channel, a secondary filter downstream of and common to all of said primary filters, means mounting each primary filter for movement relative to the respective air flow channel and permitting periodically changing the position of each primary filter such that the air flow through the respective channels will dislodge fiber waste from the respective primary filter and convey such dislodged fiber waste to said secondary filter whereby fiber waste from said primary filters is collected against said common secondary filter, and means operatively associated with said secondary filter for removing the collected fiber waste therefrom.

30. Apparatus according to claim 29, including normally active means for periodically inverting each primary filter relative to the direction of air flow through the respective channel so that the air flow will dislodge previously collected fiber waste from each respective primary filter, sensing means for sensing the occurrence of a fire in the fiber waste in each channel, and means responsive to the sensing of such a fire in any one of said channels by the respective sensing means for (a) inactivating said inverting means of the respective machine, (b) stopping the respective machine, (c) interrupting communication between the respective channel and the common fan means, and (d) directing a fire extinguishing material into the respective channel, without interrupting communication between the remaining channels and the common fan means and during the operation of the remaining machines.

31. Apparatus according to claim 29, wherein each of said mounting means comprises means rotatably supporting each respective primary filter for rotation about an axis substantially bisecting the respective air flow channel.

32. Apparatus according to claim 31, wherein each of said primary filters normally occupies a position substantially perpendicular to the direction of flow of the air through the respective air flow channel, and means for periodically changing the position of each primary filter including means for periodically inverting each primary filter about its axis so that fiber waste previously collected on the upstream side of the respective primary filter will be dislodged therefrom upon inversion thereof as the air flows therethrough.

33. Apparatus according to claim 31, including air pressure detecting means in each air flow channel for detecting variations in pressure therein as effected by the accumulation of fiber waste on the respective primary filter, and means for periodically changing the position of each primary filter comprising means responsive to detection of a predetermined pressure condition in each channel for inverting the respective primary filter about its rotational axis so that fiber waste previously entrapped against the upstream side of the respective primary filter then will be dislodged from the downstream side thereof by the air flowing therethrough.

* * * * *

UNITED STATES PATENT OFFICE
CERTIFICATE OF CORRECTION

PATENT NO. : 3,926,665
DATED : December 16, 1975
INVENTOR(S) : John Harrap and Richard Gordon Stewart It is certified that error appears in the above-identified patent and that said Letters Patent are hereby corrected as shown below:

Column 1, Line 63, "Steward" should be --Stewart--.
Column 3, Line 62, "it" should be --if--. Column 6, Line 33, "is" should be --in--. Column 9, Line 23, "configuration" should be --conflagration--. Column 12, Line 8, after "coil" insert --of--.

Signed and Sealed this sixteenth Day of March 1976

[SEAL]

Attest:

RUTH C. MASON
Attesting Officer

C. MARSHALL DANN
Commissioner of Patents and Trademarks